(12) United States Patent
Wohlfahrt et al.

(10) Patent No.: US 8,754,774 B2
(45) Date of Patent: Jun. 17, 2014

(54) SENSOR WITH MOUNT

(71) Applicant: TRW Automotive Electronics & Components GmbH, Radolfzell (DE)

(72) Inventors: Karl-Heinz Wohlfahrt, Bodman-Ludwigshafen (DE); Maxim Wasetzki, Singen (DE)

(73) Assignee: TRW Automotive Electronics & Components GmbH, Radolfzell (DE)

( * ) Notice: Subject to any disclaimer, the term of this patent is extended or adjusted under 35 U.S.C. 154(b) by 0 days.

(21) Appl. No.: 13/889,379

(22) Filed: May 8, 2013

(65) Prior Publication Data

US 2013/0248664 A1 Sep. 26, 2013

Related U.S. Application Data

(62) Division of application No. 12/380,248, filed on Feb. 25, 2009, now Pat. No. 8,456,311.

(30) Foreign Application Priority Data

Mar. 6, 2008 (DE) .................... 20 2008 003 168 U (51) Int. Cl.
    *G08B 21/00* (2006.01)
(52) U.S. Cl.
    USPC ........ 340/604; 248/682; 248/309.1; 340/603; 340/618; 340/619; 73/170.17
(58) Field of Classification Search
    CPC ..... B60S 1/0822; B60S 1/0888; B60S 1/0881
    USPC ......... 248/682, 314, 309.1, 500, 510, 222.51, 248/222.52, 291.1, 292.13, 296.1; 340/604, 340/603, 618, 619; 73/170.17; 250/341.8; 348/148, 836–839; 403/353
    See application file for complete search history.

(56) References Cited

U.S. PATENT DOCUMENTS

| | | | |
|---|---|---|---|
| 2,779,616 A | 12/1954 | Houghton | |
| 2,866,082 A | 12/1958 | Clayton et al. | |
| 4,691,840 A | 9/1987 | Ferbrache | |
| 5,699,229 A * | 12/1997 | Brownell | 361/719 |
| 6,299,319 B1 | 10/2001 | Mertens et al. | |
| 6,581,484 B1 * | 6/2003 | Schuler | 73/866.5 |
| 6,894,619 B1 * | 5/2005 | Schmitt et al. | 340/604 |
| 2004/0211875 A1 * | 10/2004 | Wisniewski et al. | 248/500 |
| 2007/0164188 A1 * | 7/2007 | Mordau et al. | 248/503 |
| 2007/0222997 A1 | 9/2007 | Gotoh et al. | |
| 2008/0117074 A1 | 5/2008 | Wohlfahrt et al. | |

FOREIGN PATENT DOCUMENTS

| | | |
|---|---|---|
| DE | 19846969 | 1/1999 |
| JP | 63149402 | 3/1988 |
| JP | 2992667 | 10/1999 |
| JP | 2001141645 | 5/2001 |
| JP | 2007256109 | 10/2007 |
| JP | 2008151769 | 7/2008 |
| JP | 200992667 | 4/2009 |
| WO | 0105636 | 1/2001 |

* cited by examiner

*Primary Examiner* — Terrell McKinnon
*Assistant Examiner* — Michael McDuffie
(74) *Attorney, Agent, or Firm* — Tarolli, Sundheim, Covell & Tummino LLP (57) ABSTRACT

An assembly includes a mount (10) and a sensor (30), in particular a rain/light sensor for a motor vehicle, the mount (10) including at least two abutments (12) for a clamping bracket (50), wherein at least one clamping bracket (50) is hinge-fitted to the sensor (30) at two bearing points, the clamping bracket (50) being adapted to swivel between a mounting position and a clamping position, in which it urges the sensor (30) against the mount (10) with a pretensioning force.

9 Claims, 10 Drawing Sheets

SENSOR WITH MOUNT

RELATED APPLICATIONS

This application is a divisional application of U.S. patent application Ser. No. 12/380,248, filed Feb. 25, 2009, which claims the benefit of German Application No. 20 2008 003 168.0, filed Mar. 6, 2008, the subject matter of which are incorporated herein by reference in their entirety.

TECHNICAL FIELD

The present invention relates to an assembly including a mount and a sensor, in particular a rain/light sensor for a motor vehicle.

BACKGROUND OF THE INVENTION

A variety of assemblies comprised of a mount and a sensor of this type are known. The essential function of this assembly consists in enabling the sensor to be fastened to the mount and thus to the windshield of a motor vehicle so as to permit a simple and reliable attachment, on the one hand, and an exchange of the sensor, if required, on the other hand. Specifically, the assembly must ensure that the sensor is fastened in the mount with a certain pretension.

The object of the present invention is to provide such an assembly.

BRIEF SUMMARY OF THE INVENTION

According to the invention, an assembly includes a mount and a sensor, in particular a rain/light sensor for a motor vehicle, the mount including at least two abutments for a clamping bracket, wherein at least one clamping bracket is hinge-fitted to the sensor at two bearing points, the clamping bracket being adapted to swivel between a mounting position and a clamping position, in which it urges the sensor against the mount with a pretensioning force. Particularly the clamping bracket makes it possible to fit the sensor in the mount in a pretensioned condition with little expenditure involved.

DETAILED DESCRIPTION OF THE PREFERRED EMBODIMENTS

Figure 1:
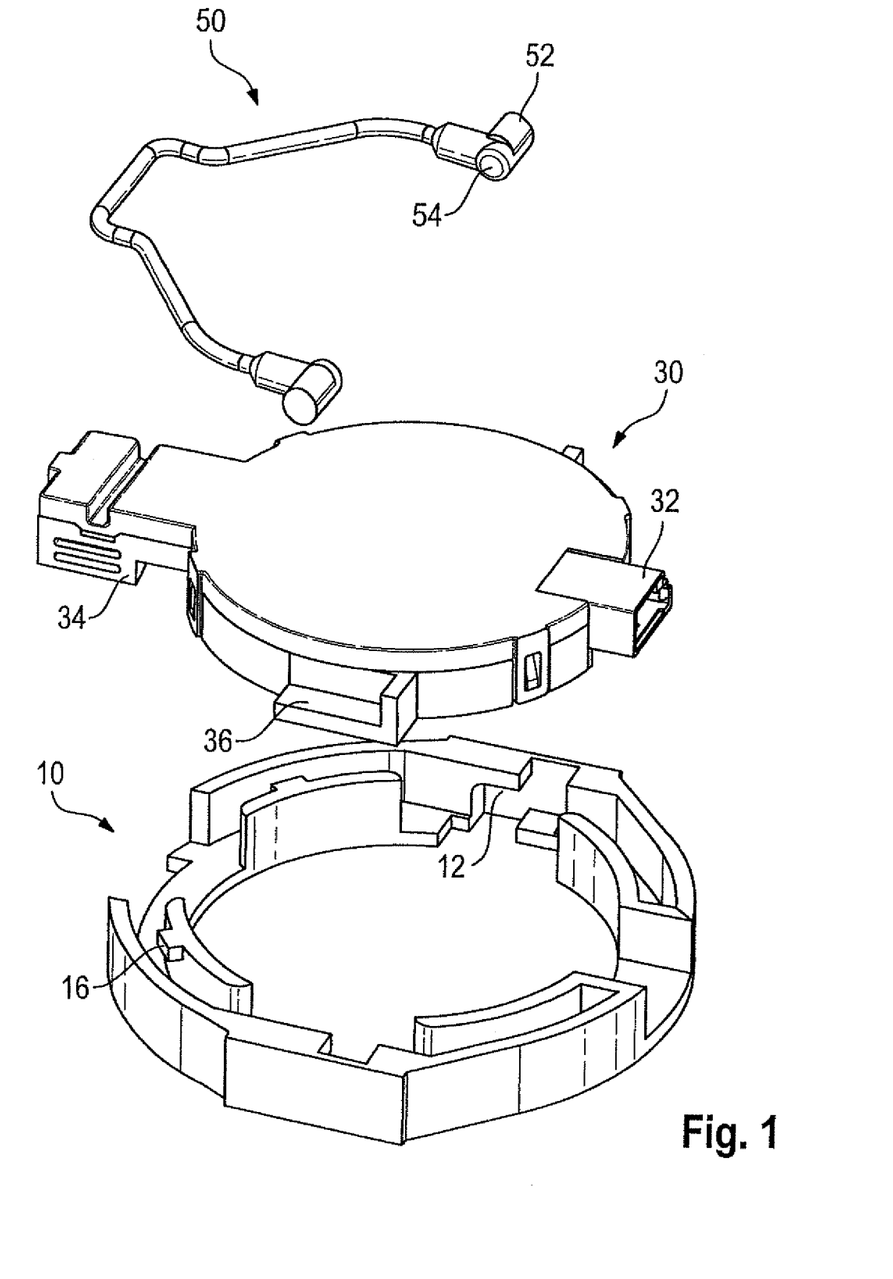
FIG. 1 shows an exploded view of an assembly according to a first embodiment of the invention.
Figure 2:
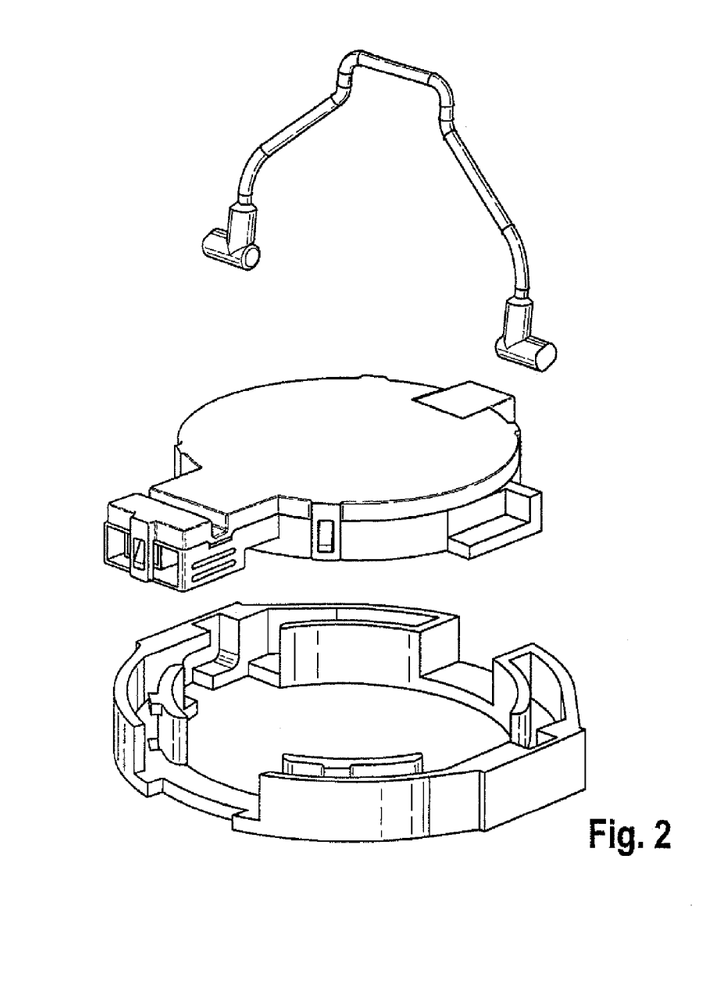
FIG. 2 shows another exploded view of this assembly.
Figure 3:
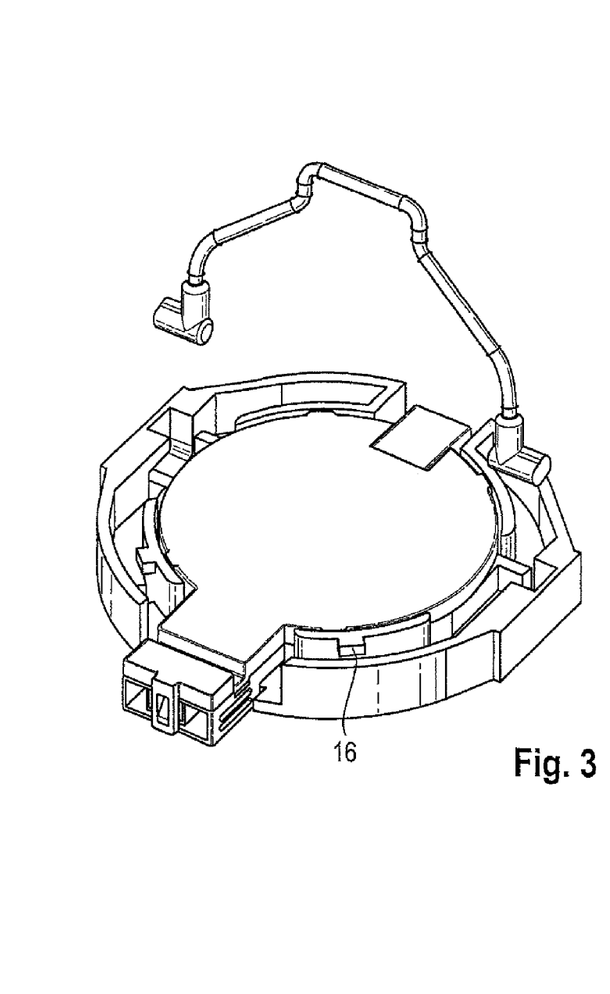
FIG. 3 shows the assembly of FIG. 2, with the sensor placed in the mount.

FIGS. 1 to 3 show an assembly according to a first embodiment which contains as its essential components a mount 10, a sensor 30, and a clamping bracket 50.

The mount 10 is a substantially ring-shaped frame which has a central receiving space for the sensor 30. The mount 10 has two abutment faces 12 for engagement by the clamping bracket 50.

The sensor 30 is a rain/light sensor which includes a plug connection 32 on one side and a moisture/temperature sensor 34 on the other side. The actual rain/light sensor is mounted in the center of the sensor body. Provided on two oppositely located sides of the sensor 30 are clamping faces 36 which are formed on laterally protruding clamping projections.

The clamping bracket 50 is in the form of a wire bracket here and has two eccentrics 52 at its ends, the eccentrics protruding over a bearing journal 54.

For assembly purposes, the sensor 30 is inserted into the mount 10, which is usually already fitted to a windshield of a motor vehicle; the plug connection 32 and the moisture/temperature sensor 34 ensuring together with corresponding recesses in the mount 10 that the sensor 30 can only be inserted in one single correct orientation (see FIG. 3).

Figure 4:
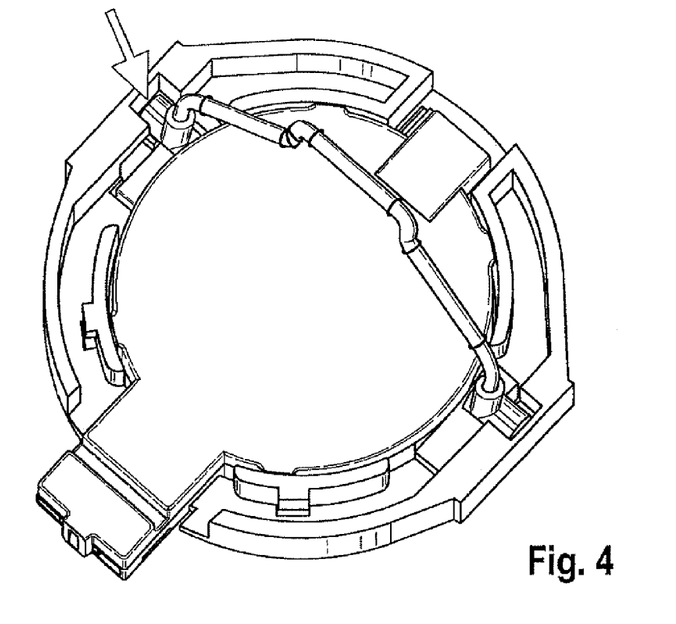
FIG. 4 shows the assembly of FIG. 3 in a pre-locked position in the condition at the time of delivery.
Figure 5:
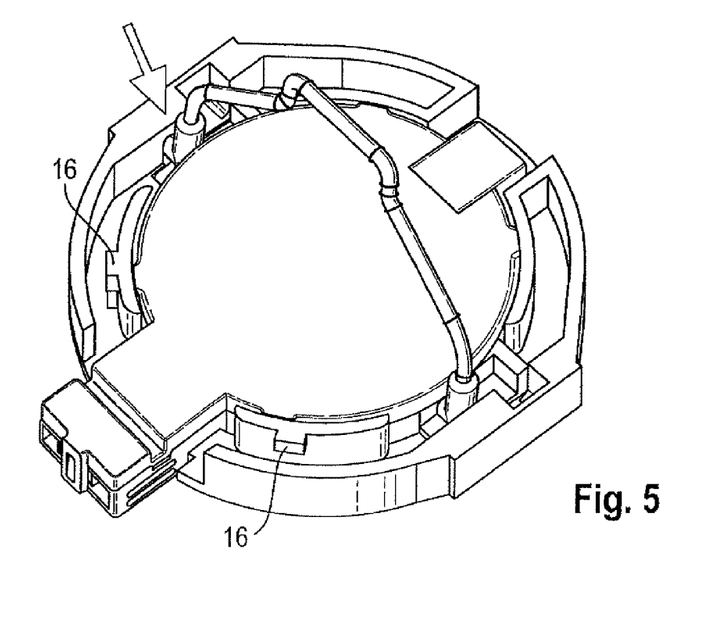
FIG. 5 shows the assembly of FIG. 4 in a locked condition during final assembly for pre-fixing.
Figure 6:
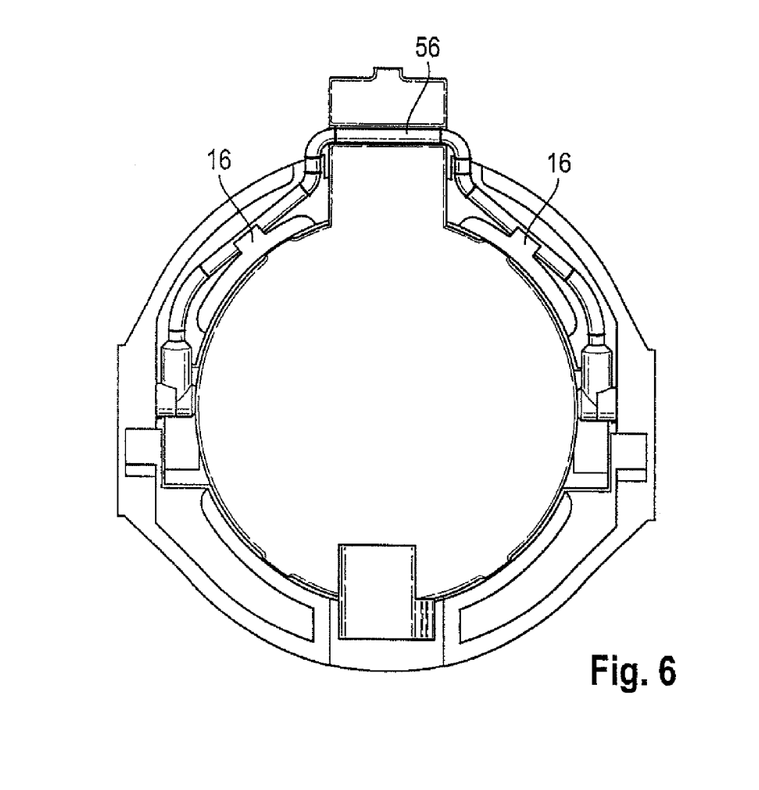
FIG. 6 shows a top view of the assembly in the finally assembled condition.
Figure 7:
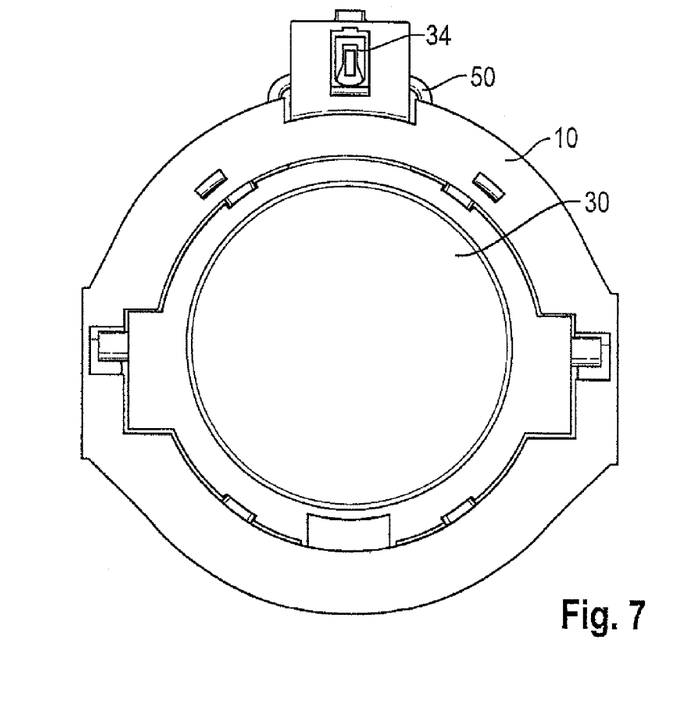
FIG. 7 shows a bottom view of the assembled assembly.
Figure 8:
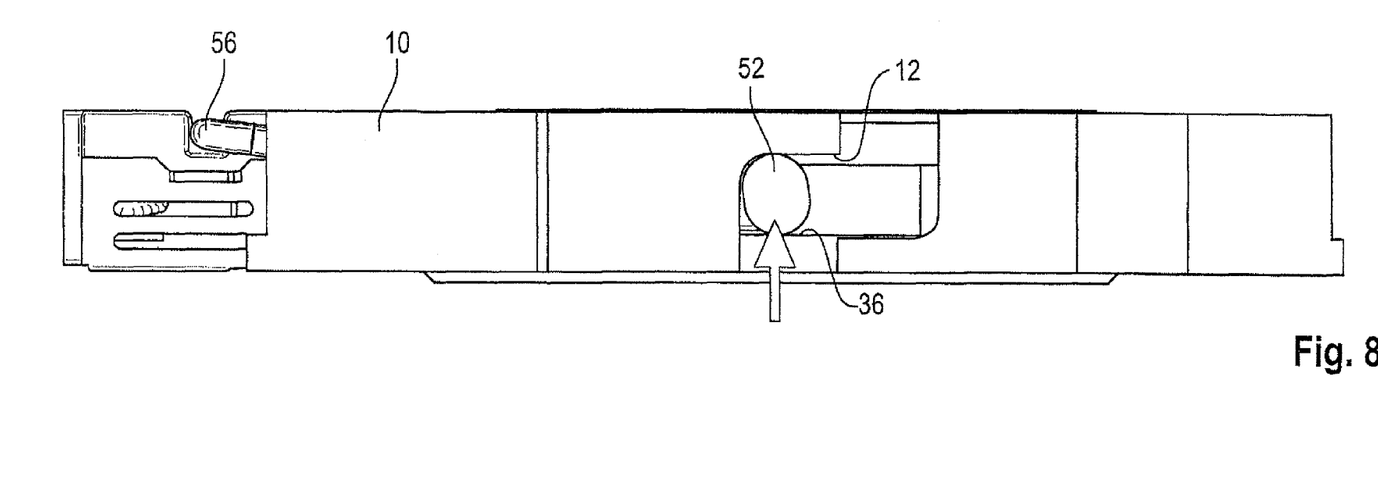
FIG. 8 shows a side view of the assembled assembly.

In the as-delivered condition the clamping bracket 50 is pre-locked at the sensor 30 (see FIG. 4) and is shifted during assembly into a correctly locked position (see FIG. 5), in which the bearing journals 54 with the eccentrics 52 of the clamping bracket are positioned between the clamping faces 36 and the abutment faces 12. The clamping bracket is then swiveled through 90 degrees so that a pretension of 30 N is applied on each bearing point through the eccentric, the pretension being used to press the sensor 30 into the mount 10. In the clamping position, i.e. swiveled through 90 degrees (see FIG. 6), the clamping bracket 50 locks into place behind two locking projections 16 on the mount 10. In the locked condition, a part of the clamping bracket 50 which acts as a contact pressure section 56 lies in a depression in the area of the moisture/temperature sensor 34 to also press the sensor 30 towards the mount 10 in this area.

Figure 9:
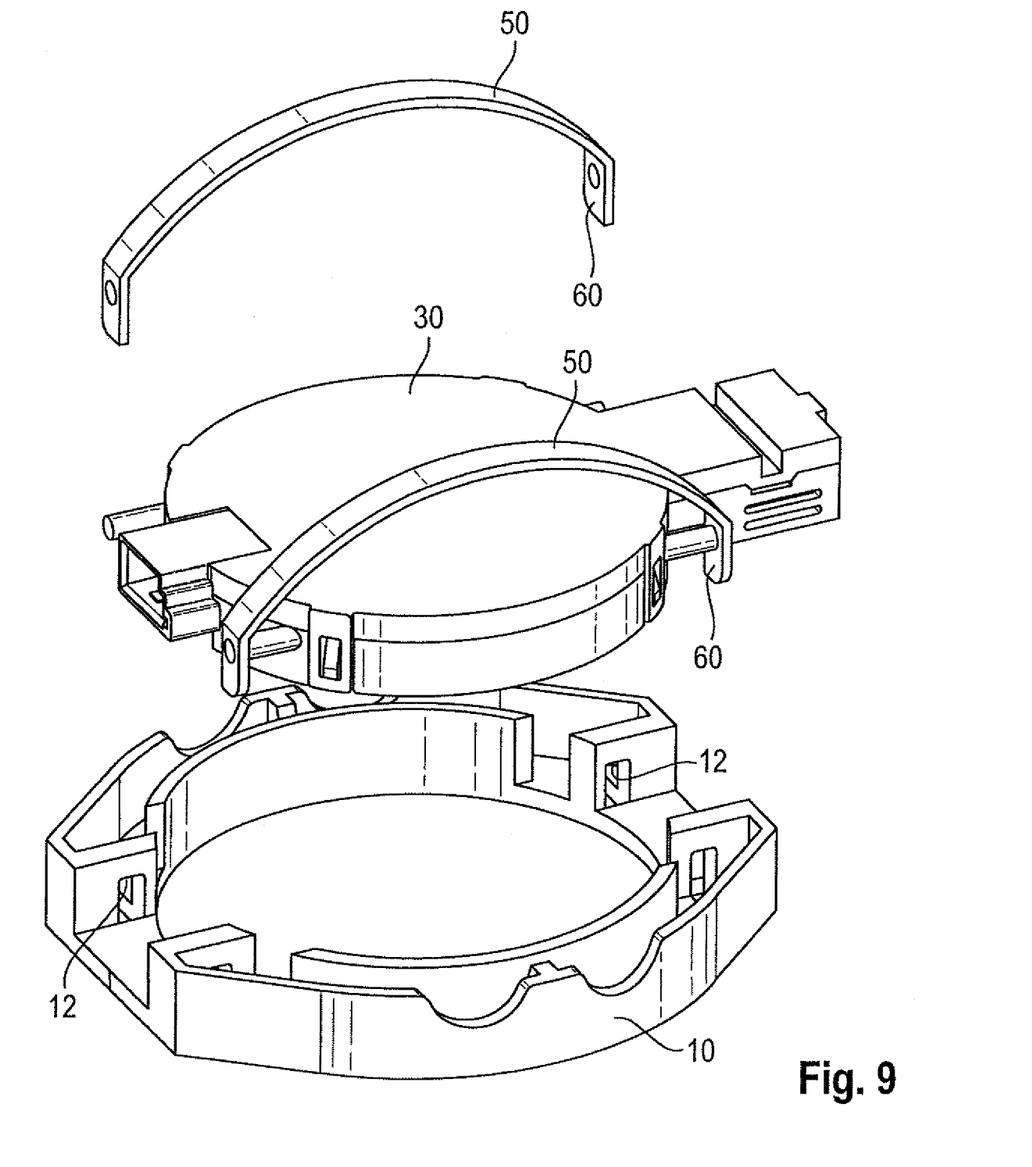
FIG. 9 shows an exploded view of an assembly according to a second embodiment of the invention.

FIG. 9 shows a mount according to a second embodiment. The difference from the first embodiment consists in that not only one single clamping bracket 50 is used, but two clamping brackets, and in that the clamping brackets 50 do not have eccentrics provided thereon for applying the clamping force, but clamping projections 60 which are arranged beyond the bearing journal of the clamping bracket 50.

Figure 10:
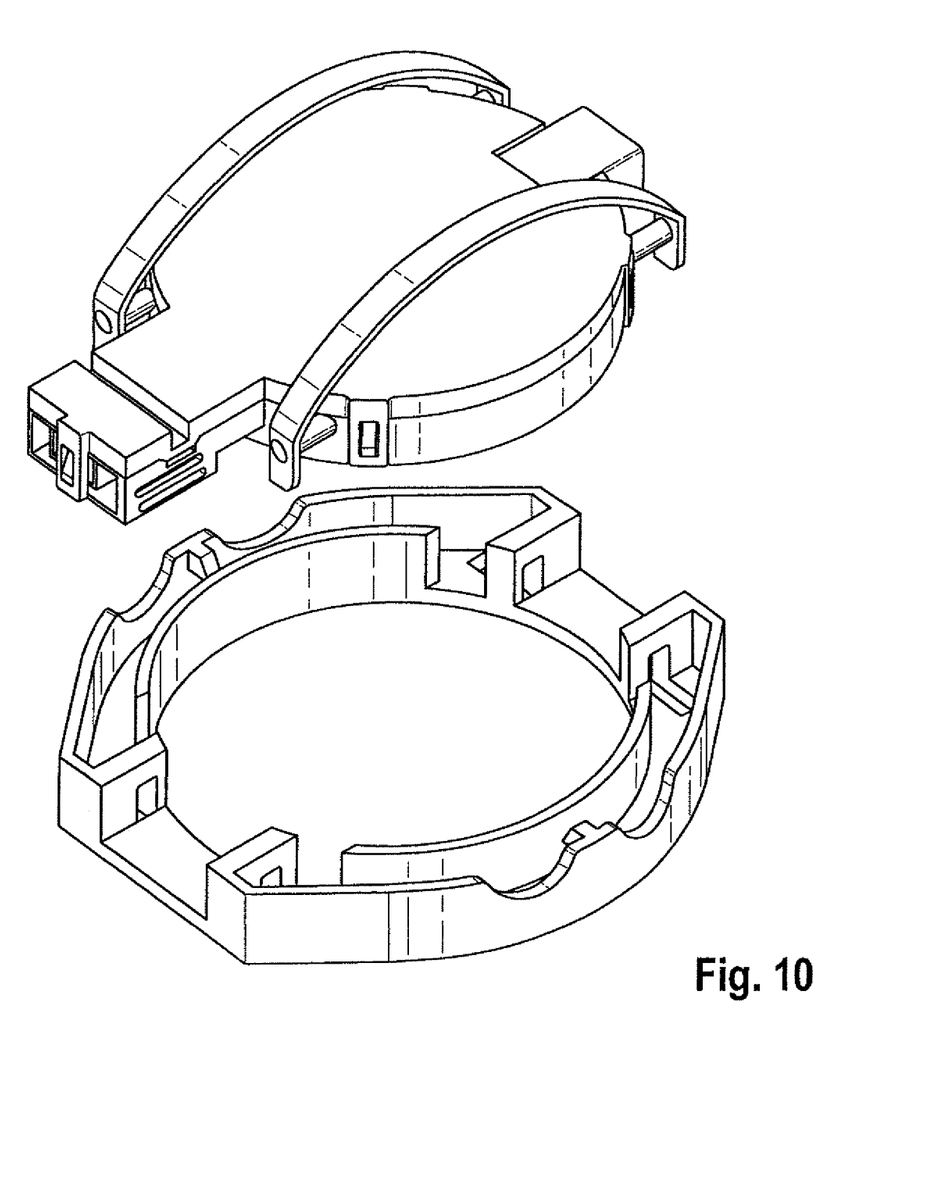
FIG. 10 shows the assembly of FIG. 9 with preassembled clamping brackets.
Figure 11:
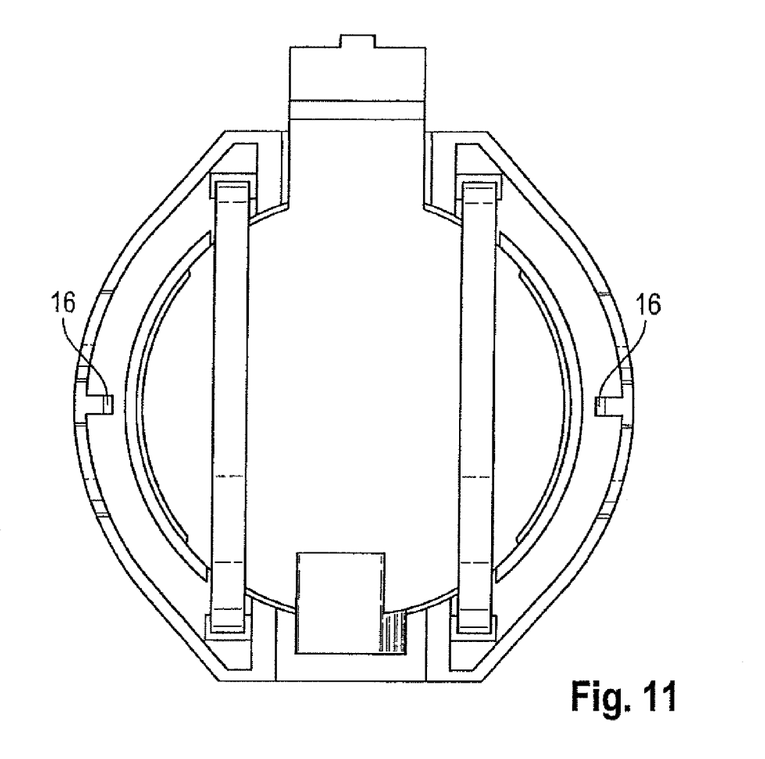
FIG. 11 shows a top view of the assembly of FIG. 9 in the pre-locked condition.
Figure 12:
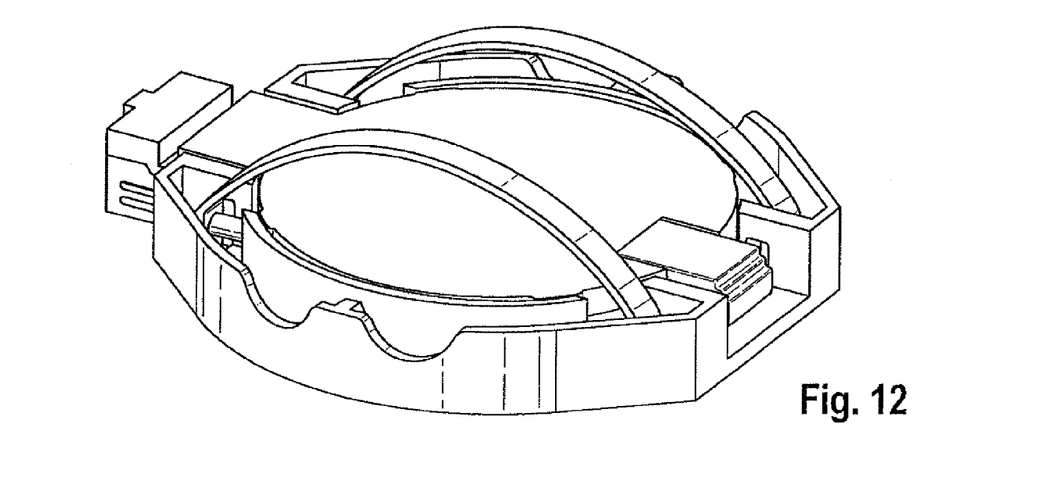
FIG. 12 shows a perspective view of the assembly of FIG. 11.
Figure 13:
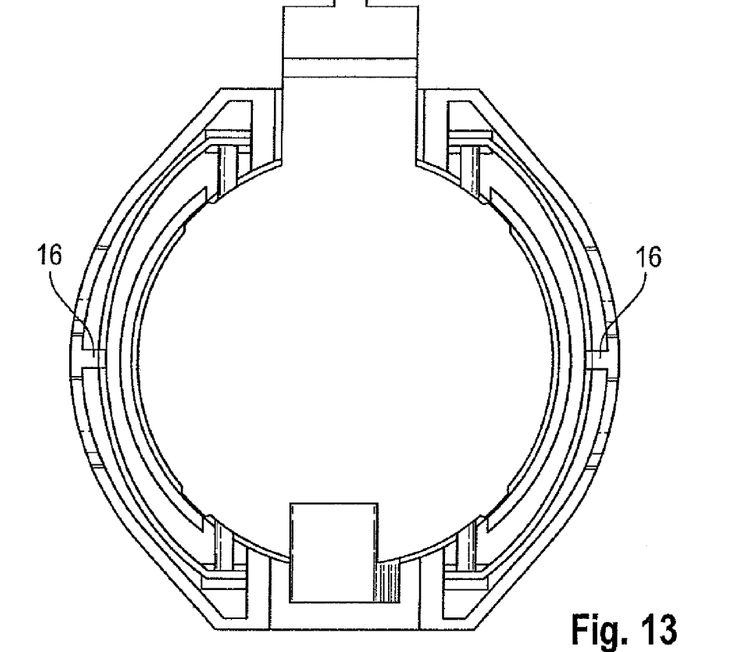
FIG. 13 shows a top view of the assembly of FIG. 9 in the assembled condition.
Figure 14:
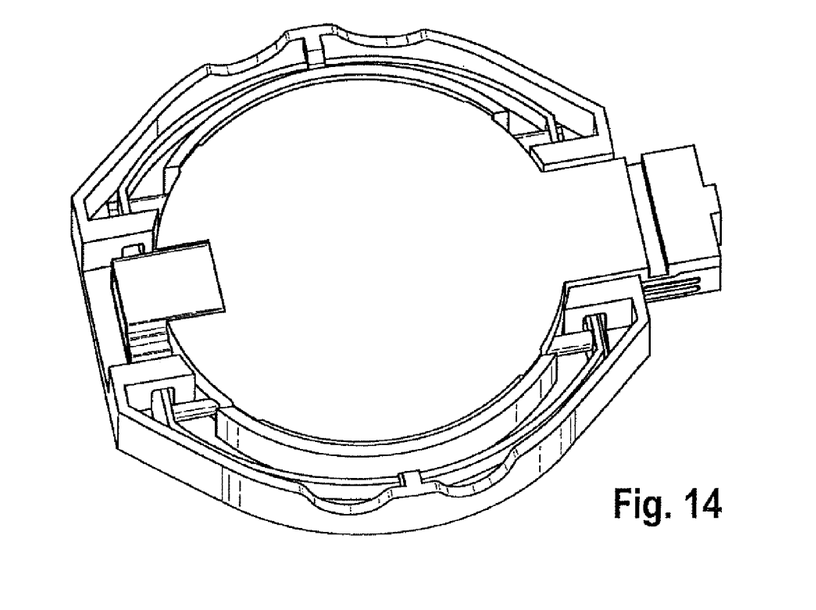
FIG. 14 shows a perspective view of the assembled assembly.
Figure 15:
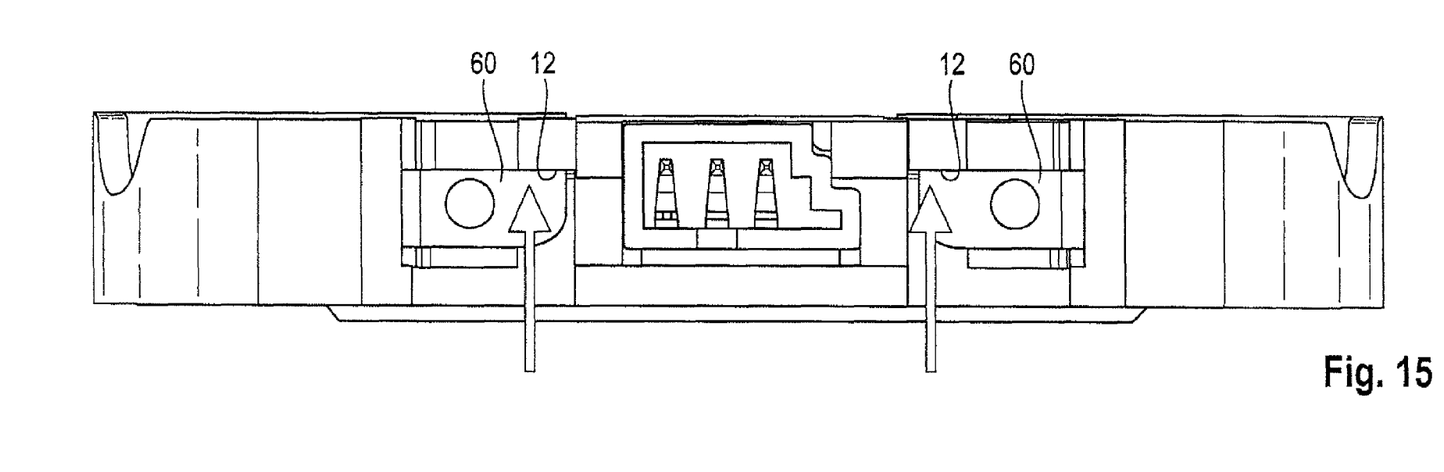
FIG. 15 shows a side view of the assembled assembly.

FIG. 10 shows the preassembled condition, in which the two clamping brackets 50 are in the mounting position. The sensor 30, along with the two clamping brackets 50, is inserted into the mount 10 (see FIGS. 11 and 12), in which it is pre-locked by means of a clipping point. Then the two clamping brackets 50 are each moved outward through 90 degrees into the clamping position, in which the clamping projections 60 engage the abutment faces 12 of the mount 10 and thereby press the sensor 30 against the mount 10 with a pretensioning force of 15 N per bearing point. In the clamping position the clamping brackets 50 snap into place behind locking projections 16 of the mount 10. The clamping projections 60 engaging the abutment faces 12 can be clearly seen in FIG. 15.

The invention claimed is:

1. An assembly comprising a mount, at least one clamping bracket, and a rain/light sensor for a motor vehicle, the at least one clamping bracket being hinge-fitted to the sensor at first and second coaxial bearing points, the mount including first and second abutments engageable by the at least one clamping bracket, the at least one clamping bracket being adapted to swivel about the first and second bearing points between a mounting position and a clamping position, in which the at least one clamping bracket engages the first and second abutments on the mount and the clamping bracket urges the sensor against the mount with a pretensioning force, the at least one clamping bracket including a first clamping bracket having a first pair of coaxial bearing points arranged opposite each other and a second clamping bracket having a second pair of coaxial bearing points arranged opposite each other, the first clamping bracket being adapted to swivel about the first pair of bearing points relative to the sensor and the second clamping bracket being adapted to swivel about the second pair of bearing points relative to the sensor.

2. The assembly according to claim 1, wherein the at least one clamping bracket has ends that each include a clamping projection.

3. The assembly according to claim 1, wherein the second pair of bearing points includes third and fourth coaxial bearing points.

4. The assembly according to claim 3, wherein the first clamping bracket includes first and second clamping projections that engage first and second abutments on the mount, the second clamping bracket including third and fourth clamping projections that engage third and fourth abutments on the mount.

5. The assembly according to claim 4, wherein the mount has a first locking projection that engages the first clamping bracket to hold the first clamping bracket in the clamping position with the first and second clamping projections engaging the first and second abutments, the mount having a second locking projection that engages the second clamping bracket to hold the second clamping bracket in the clamping position with the third and fourth clamping projections engaging the third and fourth abutments.

6. An assembly according to claim 5, wherein the first locking projection engages the first clamping bracket between the first and second bearing points when the first clamping bracket is in the clamping position, the second locking projection engaging the second clamping bracket between the third and fourth bearing points when the second clamping bracket is in the clamping position.

7. The assembly according to claim 1, wherein the mount is provided with at least one locking projection behind which the at least one clamping bracket snaps into place in the clamping position.

8. The assembly according to claim 7, wherein the at least one locking projection engages the at least one clamping bracket between the first and second bearing points.

9. The assembly according to claim 1, wherein the at least one clamping bracket includes first and second clamping projections that engage the first and second abutments on the mount.

* * * * *